Aug. 16, 1966 R. G. HEINCELMAN 3,266,838
AUTOMATIC LATCH MECHANISM FOR FOLDABLE CONVERTIBLE TOP
Filed Nov. 3, 1964 2 Sheets-Sheet 2

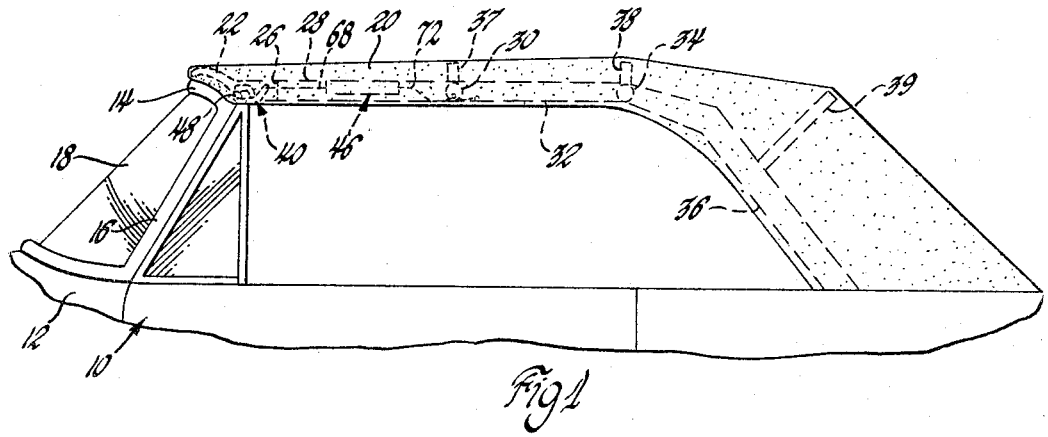

INVENTOR.
Raymond G. Heincelman
BY
Edward E. James
ATTORNEY

United States Patent Office 3,266,838
Patented August 16, 1966

3,266,838
AUTOMATIC LATCH MECHANISM FOR FOLDABLE CONVERTIBLE TOP
Raymond G. Heincelman, Bloomfield Hills, Mich., assignor to General Motors Corporation, Detroit, Mich., a corporation of Delaware
Filed Nov. 3, 1964, Ser. No. 408,596
9 Claims. (Cl. 296—121)

This invention relates generally to latch mechanisms and more particularly to a latch mechanism adapted to lock the supporting frame of a foldable convertible top in weather sealing engagement with a windshield supporting member to enclose the passenger compartment of a convertible automotive vehicle.

The top header latching mechanism of this invention is similar to that shown in Heincelman 3,216,763 in that it includes a latch lever which is movable between extended and retracted positions with respect to the side rail of a convertible top frame.

The instant invention provides an improved top latching mechanism mounted within a forward side rail and the attached end portion of the front transverse rail or header of the foldable top supporting frame and having a movable bolt or latch member operably connected and conditioned for automatic latching engagement and release by opening and closing movement of the top frame relative to a striker located on the adjacent upper corner of the windshield mounting pillar or header.

In an illustrative embodiment, a latch member mounted at each end of the front rail is movable between an unlatched striker-disengaging position and a striker-engaging latched position. Each latch member is spring-biased toward its disengaged position and is normally maintained therein by a spring-biased detent whenever the top is released and folded toward its opened position. As the top is closed, the windshield header or striker engages and moves the detents to release the latch members for movement to their striker engaging latched positions. Such top locking movement of each detent released latch member is normally effected and maintained by a side rail mounted spring motor operably connected between the latch member and frame. Energy storage or loading of each spring motor occurs during initial top folding movement and is normally maintained during further top opening and subsequent top closing movement by a spring-biased pawl or locking member engageable with an abutment on the spring motor. Top folding movement thus conditions the spring motors for automatic actuation of the latch members to their striker engaging, top locking positions as subsequent top closing movement causes the windshield header or striker to engage and release the detents from the latch members. When the top is closed and locked, release of the motor locking pawls permits unloading of the spring-stored energy and returns the latch members to their disengaged top releasing positions. As the released top is folded, the spring-biased detents again engage and hold the disengaged latch members against loading of the spring motors.

The improved top latching mechanism of the invention has particular utility in combination with a power-operated top since latching engagement is automatically effected by movement of the front rail of the top supporting frame into proximate engagement with the windshield supporting members of the body. However, its use is not limited to power-operated tops.

In manually operated tops, energy storage in the spring motor may be easily effected by the leverage obtainable through the folding linkage of the top supporting frame. As applied to the striker engaged latch member, such stored energy assures proper top locking and sealing engagement between the windshield header and a resilient weatherseal carried by the front rail of the top frame. The geometry of the operative connection between the latch member and its operating spring motor is preferably such that the weatherseal clamping and compressing forces applied between the windshield header and front top rail by the effected latching engagement normally act over-center to resiliently and effectively lock the latch lever in its retracted, striker engaging latched position.

The foregoing and other objects, advantages and features of the invention will be apparent and more thoroughly understood from the following description of the illustrative embodiment, having reference to the accompanying drawings, in which:

FIGURE 1 is a fragmentary side elevational view of the upper portion of a motor vehicle body having a foldable convertible top shown in its raised, frame and control linkage extended closed position relative to a transverse windshield supporting header;

FIGURE 2 is an enlarged fragmentary sectional view of a latch mechanism constructed in accordance with the invention and shown in its side rail mounted and locked position relative to a striker carried by the adjacent corner of the windshield mounting header;

FIGURE 3 is a view similar to FIGURE 2 and shows the elements of the illustrative latch mechanism actuated to their top releasing positions;

FIGURE 4 is a similar fragmentary sectional view showing the top frame folded to an intermediate position conditioning the illustrative latch mechanism for subsequent automatic latching engagement with the header supported striker;

Figure 5:
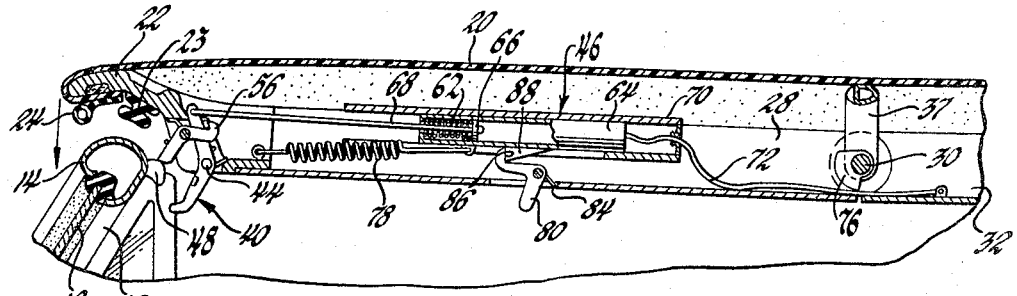
FIGURE 5 is a view similar to FIGURES 2 and 3 and shows the detent and latch members of the illustrative latch mechanism just prior to automatic latching engagement with the striker.
Figure 6:
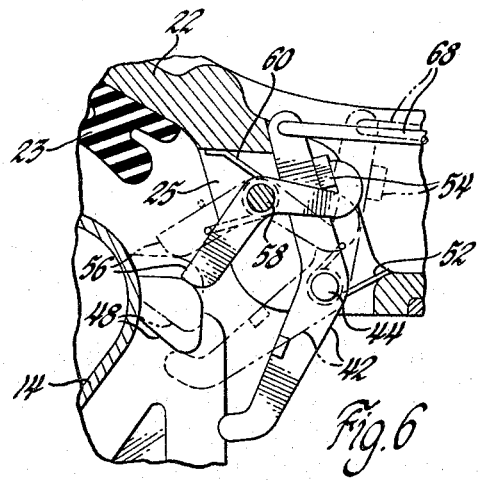
Figure 7:
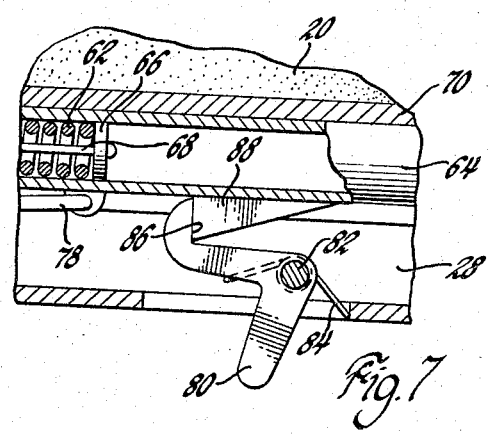

FIGURE 6 is an enlarged view corresponding to a portion of FIGURE 5 and shows intermediate broken line positions of the several latch elements just after striker camming of the detent member out of the blocking engagement with the latch member; and FIGURE 7 is an enlarged view of a portion of FIGURE 2 and further illustrates the spring-biased, manually released pawl which normally locks the spring motor in its loaded latch operating position.

Referring more particularly to FIGURE 1, the upper portion of an automotive vehicle body of the convertible type is indicated generally by the reference numeral 10. A windshield header 14 extends laterally between two vertically inclined pillars 16 and cooperates with a vehicle body cowl portion 12 to mount a windshield 18 forwardly of the vehicle passenger compartment. A foldable top 20 of suitable fabric or plastic sheet material is shown in a frame supported raised position enclosing the passenger compartment. As shown in broken lines in FIGURE 1, the top supporting frame is articulated in a conventional manner and is foldable by an extensible control linkage, not shown, between a retracted top opened position and its extended position closing the passenger compartment. The top supporting frame includes a front rail or header member 22 which is bowed transversely of the vehicle and mates with the windshield header 14 when in its closed position shown in FIGURES 1 and 2. The forward undersurface of this front rail mounts a weatherstrip 23 and a wind-lacing seal 24 in closely spaced parallel relation. Locking operation of two laterally spaced top latching mechanisms 40 embodying the invention causes the sealing members 23 and 24 to compressively engage the windshield header.

As shown in FIGURES 2–6, the opposite ends of the front rail 22 are curved downwardly and rearwardly. These front rail end portions are preferably perforated as indicated at 25 and are suitably joined at 26 to two forward side rail members 28 of upwardly opening channeled cross-section. The two side rail members 28 are pivotally connected at 30 to two intermediate side rail members 32 which are in turn pivotally connected at 34 to two rear side rail members 36. These rear members are pivotally mounted within the top well of the vehicle body and form top actuating arms which are operably connected through appropriate control linkages, not shown, to effect desired top folding or extending movement in a conventional manner. Two top supporting bows 37, 38 extend laterally between the side rail pivotal connections at 30 and 34. A rearwardly inclined third bow 39 is suitably connected and extends laterally to support the transverse rear corner of the top between the two rear side rails or top supporting control arms 36.

In FIGURES 2–6 of the accompanying drawings, only the latch mechanism 40 on the right-hand side of the vehicle is shown in structural and operational detail and the following description is specifically related thereto. It will be apparent, however, that a similar latch mechanism is mounted within the front left-hand corner of the top frame and is shown in broken lines in FIGURE 1. Hence, the following description is equally applicable to the left latch mechanism.

The illustrative latch mechanisms 40 are mounted substantially within the forward side rails and the attached front rail end portions of the top supporting frame. Each includes a latch member or bolt 42 in the form of a bellcrank lever. These latch levers are pivotally mounted at 44 within the front rail openings 25. Each latch lever is operably connected to a side rail mounted spring motor 46 for swinging actuation between an unlatched position shown in FIGURES 3–6 and a latched, top locking position shown in FIGURES 1 and 2. In their spring motor maintained latched positions the two latch levers 42 are substantially retracted within the front rail end portions and individually engage two laterally spaced strikers 48 formed or located on the adjacent upper corners of the windshield mounting header and pillars and thus lock the top in its closed position.

When actuated to their unlatched or striker disengaged positions, the motor attached arm of each latch lever is rotated into limiting engagement with a rail formed stop 50. The striker disengaged arm is thus rotated to a position projecting downwardly from the front rail opening. As best seen in FIGURE 6, a spring 52 mounted on the pivot 44 is torsionally interposed between each latch lever and the adjacent front rail end portion. This spring biases the latch lever toward its striker disengaged position whenever the top latching mechanism is released and the top is folded as shown in FIGURES 3 and 4 toward its opened position. The latch lever is normally engaged at 54 and maintained in its disengaged position by a bellcrank detent lever 56. The detent lever is pivotally mounted at 58 in the corresponding opening of the front rail end portion and is biased by a pivot mounted torsion spring 60 toward its latch lever blocking position. The detent lever thus locks the latch lever in its disengaged position during subsequent top folding movement to and from its fully opened position. As the front rail of the top frame again approaches its closed position proximate to the windshield header, camming engagement is effected between the striker and a forwardly extending arm on the detent lever as shown in full lines in FIGURES 5 and 6. Such engagement swings the detent lever to the broken line position shown in FIGURE 6 and thus releases each latch lever for spring motor actuation to its striker engaging, top locking position.

The latch operating spring motor 46 includes a spring 62 which is compressively interposed between one end of a spring housing cylinder 64 and a spring seating member 66. The spring seating member is slidably mounted in the cylindrical housing and operably connected by a rod 68 to the latch lever. The cylindrical housing is slidably mounted in a cylindrical bracket 70 supported by and extending longitudinally within the forward side rail. The end of the spring housing cylinder 64 distal from the latch lever is connected by a flexible member 72 to the adjacent intermediate side rail member at 74. As best shown in FIGURES 2–5, this flexible member engages a pulley sector 76 secured to and rotatable with the front rail pivot 30. During top folding movement, this pulley sector cooperates with the flexible connecting member to shift the spring housing cylinder rearwardly of the side rail and compressively loads the latch lever attached spring 62. Such rearward movement of the spring housing cylinder is also effected against a return spring 78 tensively interposed between the spring housing cylinder and the adjacent end of the front rail member. The compressive spring loading position thus obtained by the spring housing cylinder during initial top folding movement is normally maintained during further top opening movement and subsequent top closing movement by a bellcrank pawl or locking lever 80 pivotally mounted at 82 within the side rail. This pawl 80 is biased by a pivot mounted torsion spring 84 into locking engagement at 86 with an abutment ramp 88 provided on the spring housing cylinder.

Top opening movement thus conditions the detented latch lever 42 and the spring motor 46 to provide automatic actuation of the latch lever to its striker engaging, top locking position during subsequent top closing movement as the header or pillar mounted striker engages and swings the detent lever to release the latch lever for such actuation. When the top is in its closed position, manual release of the locking pawl 80 permits the spring housing cylinder 64 to be shifted forwardly of its side rail mounted bracket 70 by the return spring 78 to the position shown in FIGURE 3. Such spring housing movement unloads the latch actuating spring 62 and tenses the housing connected flexible member 72 against the pulley sector 76. The latch lever 42 is thus rotated by the torsion spring 52 to its striker disengaged, top releasing position in abutment with the stop 50. As the released forward rail 22 is initially moved upwardly as shown in FIGURE 3, the detent lever 56 disengages the adjacent striker and is again rotated into holding engagement with the disengaged latch lever by the torsion spring 60. The latch lever is held in this detented position against compressive loading of its actuating spring 62 by top folding movement winding the flexible member on the pulley sector and shifting the spring housing to its pawl locked position shown in FIGURE 4 and during subsequent opening and return of the top supporting frame to its detent releasing, latch actuating position as the front rail member again approaches a substantially closed position proximate the windshield header as shown in FIGURES 5 and 6.

From the foregoing description, it will be seen that the illustrative embodiment provides a relatively simple top locking latch mechanism capable of providing the various stated objects and structural and functional advantages of the invention. It will be further apparent that various modifications and changes might be made in and from the disclosed embodiment without departing from the spirit and scope of the invention as defined in the following claims.

I claim:

1. A convertible top latching mechanism for an automotive vehicle body including
 a windshield mounting member supported above the body,
 a striker supported on an upper portion of the windshield mounting member,
 a top supporting frame foldable between top opened and closed positions relative to a body defined passenger compartment,
 said frame including a front rail member movable to a top closed position proximate the windshield mounting member,
 a latch member mounted on the front rail member and movable between an unlatched position and a top locking position latchably engageable with the striker when the top is in its closed position, a first detent means normally engageable to restrain said latch member in its unlatched position and automatically releasable during final top closing movement of the front rail member to permit movement of the latch member to its top locking position, motor means mounted on said frame and operably connected to receive and store energy during top opening movement of the frame and to selectively actuate said latch member between its unlatched and top locking positions upon release of said first detent means as the front rail member approaches its top closed position proximate the windshield mounting member, and a second detent means normally engageable to maintain the motor means in its energy storing and latch locking condition and selectively releasable to cause the motor means to return the latch member from its striker engaging locked position to its unlatched position thereby permitting subsequent folding movement of the top supporting frame to its opened position.

2. A top latching mechanism for an automotive vehicle body having a windshield mounting member supported above the body and a convertible top foldable between a lowered top opened position and a raised position closing the top with respect to a vehicle body defined passenger compartment, said mechanism including a striker located on an upper portion of the windshield mounting member, a top supporting frame member movable to a top closed position proximate the windshield mounting member, latch means mounted on said top frame member and including a latch member movable between an unlatched position and a locking position latchably engaging the striker when the top is in its raised position, means for normally retaining said latch member in its unlatched position and operable by relative top closing movement occuring between said top frame and windshield mounting members to release the latch lever for movement to its top locking position, and motor means operably connected and conditioned by top opening movement of the top supporting frame to automatically actuate said latch member to its top locking position upon release of said retaining means as the top frame member approaches its top closed position proximate the windshield mounting member, and said motor means being selectively operable to return the latch member to its unlatched position thereby permitting subsequent folding movement of the top supporting frame to its opened position and again conditioning the motor means and latch member for automatic top locking action during subsequent movement of the frame member to its closed position proximate the windshield mounting member.

3. A top latching mechanism for an automotive vehicle body having a convertible top foldable between a top opened positon and a raised position closing the top with respect to a windshield mounting member supported above the body and forwardly of a body defined passenger compartment, said top latching mechanism including striker means supported adjacent an upper corner of the windshield mounting member, a top supporting frame including a front rail member movable to a top closed position proximate the windshield mounting member, a latch member pivotally mounted adjacent one end of the front rail member and swingable between an unlatched position and a latching position effecting top locking engagement with said striker means when the top is in its raised position, a first detent means normally engageable to restrain the latch member in its unlatched position and disengageable to release the latch member for movement to its striker engaging top locking position during top closing movement as the front rail member reaches its top closed position proximate the windshield mounting member, motor means mounted on said frame and operably connected to receive and store energy applied during top opening movement of the frame and to actuate the latch member subsequently to its top locking position upon top closing effected release by the first detent means, and a second detent means normally engageable to maintain the motor means in its energy storing and latch operating condition and releasable to cause said motor means to return the latch member from its striker engaging locked position to its detent maintained unlatched position thereby permitting folding actuation of the top supporting frame to its opened position and reenergizing the motor means for automatic top locking actuation of the latch member upon subsequent movement of the top supporting frame to its closed position.

4. A top latching mechanism for an automotive vehicle body having a convertible top foldable between top opened and closed positions relative to a windshield mounting member and a body defined passenger compartment, striker means supported above the vehicle body adjacent an upper corner of the windshield mounting member, a foldable top supporting frame linkage including a front rail member movable to a top closed position in proximate sealing engagement with the windshield mounting member, a latch member mounted adjacent one end of the front rail member and movable between an unlatched position and a latching position providing top locking engagement with said striker means when the top is in its closed position, a first detent means engageable to retain the latch member in its unlatched position and automatically releasable during top closing movement of the front rail member relative to the striker means to permit movement of the latch member to its top locking position, spring motor means mounted on said frame and operably connected to receive and store spring absorbed energy during top opening movement of the frame and to actuate and maintain the latch member in its striker engaging top locking position upon automatic release of said first detent means as the front rail member approaches said striker means and its top closed position proximate the windshield mounting member, a second detent means normally engageable to maintain said spring motor means in its spring energy storing and latch locking condition, and said second detent means being selectively releasable to return said latch member to its unlatched position thereby permitting subsequent folding movement of the top supporting frame to its opened position and latch operating energy storage by the spring motor means.

5. In a convertible type automotive vehicle having a top movable between opened and closed positions relative to a windshield mounting member and a body defined passenger compartment, a top latching mechanism comprising striker means located on an upper portion of the windshield mounting member, a top supporting frame including a front rail member movable between an opened position and a closed position proximate the windshield mounting member, a latch member mounted on the front rail member for movement between an unlatched position and a top locking position engageable with the adjacent striker means when the top supporting frame is in its closed position, a first detent member normally engageable to retain the latch member in its unlatched position and engageable by the windshield mounting member during top closing movement to release the latch member for movement to its striker engaging top locking position, a spring motor including first and second spring seating members mounted on said top supporting frame for relative spring-biased movement therebetween, means operably connecting one of said spring seating members to the latch member for actuation between its unlatched and top locking positions, a first spring means interposed between said spring seating members and normally biasing said one spring seating member in a direction tending to actuate the latch member toward its top locking position, a second spring means cooperating with said first spring means and normally biasing the other spring seating member in an opposite direction, means operably connecting the top frame to shift said other spring seating member relative to said one spring seating member against said first and second spring means during movement of the top frame toward its opened position thereby deflectively loading both of said spring means, a second detent member engageable to lock and maintain said other spring seating member in its spring loaded position during subsequent movement of the top toward its automatic latch engaging closed position, and means for selectively releasing said second detent member to permit return of the other seating member by said spring means to a position unloading the first spring means and returning the latch member to its detent maintained unlatching position.

6. A top latching mechanism for a convertible type automotive vehicle having a foldable top operable between opened and closed positions relative to a windshield mounting member supported above the vehicle body and spaced forwardly of a body defined passenger compartment, said top latching mechanism including a striker means adjacent an upper corner of the windshield mounting member, a foldable top supporting frame linkage including a front rail member movable between a lowered top opened position and a raised top closed position proximate the windshield mounting member and having two side rail portions extending rearwardly from opposite ends of the front rail member, a latch member mounted adjacent one end of the front rail member for movement between an unlatched position and a top locking position engageable with the adjacent striker means when the top supporting frame is in its raised position, a first detent member normally engageable to restrain the latch member in its unlatched position and engageably cammed by the windshield mounting member during top closing movement to release said latch member for movement to its striker engaging top locking position, a spring motor including a spring housing member mounted for linear movement longitudinally of the side rail portion extending rearwardly of the front rail mounted latch member, a spring seating member reciprocably mounted by said housing member and operably connected to actuate said latch member between its unlatched and top locking positions, a first spring means interposed between the side rail portion and the spring housing member and normally biasing the spring housing member forwardly of the side rail toward the latch member, a second spring means interposed between said spring housing and seating members and resiliently deflectable therebetween to bias and maintain the latch member in its top locking position, means operably connecting the foldable top frame to shift the spring housing member rearwardly of its mounting side rail portion against the biasing action of said spring means during folding movement of the top frame toward its lowered top open position, a second detent member engageable to lock and maintain said spring housing member in its rearward spring loaded position during subsequent movement of the top to its latch-maintained closed position, and said second detent member being releasable to permit spring-biased return of the housing member to a forward position unloading said second spring means and returning the latch member to its detent maintained unlatching position.

7. A convertible top latching mechanism for an automotive vehicle body including a windshield mounting member spaced above the vehicle body, a striker carried by the windshield mounting member adjacent an upper corner thereof, a top supporting frame linkage foldable between a lowered top opened position and a raised position closing the top with respect to a vehicle passenger compartment, said top supporting frame linkage including a front rail member having a transverse intermediate portion movable into proximate sealing engagement with the windshield mounting member when in its raised top closing position and having two laterally spaced side rail portions extending rearwardly from opposite ends thereof, a latch lever pivotally mounted adjacent one transverse end of the front rail member for swinging movement between an unlatched position and a top locking position engageable with the adjacent striker when the top supporting frame is in its raised position, a first spring means normally biasing the latch lever toward its unlatched position, a second pivotally mounted lever having a detent arm normally engageable to restrain the latch lever in its unlatched position and a second arm engageably cammed by the windshield mounting member during top closing movement to swing said second lever out of detenting engagement with said latch lever, a spring motor mounted rearwardly of the latch lever on the adjacent side rail portion, said spring motor including a spring housing member mounted for linear movement longitudinally of the side rail portion, a spring seating member reciprocably mounted relative to said spring housing member and operably connected to actuate said latch lever between its unlatched and top locking positions, a second spring means interposed between the side rail portion and the spring housing member and normally biasing the spring housing member forwardly of the side rail toward the latch lever, a third spring means interposed between said spring housing and seating members and deflectable therebetween to resiliently bias and maintain the latch lever in its top locking position, means connecting said spring housing to the foldable frame linkage and operable to shift said spring housmember rearwardly of the side rail portion against the resilient biasing action of the second and third spring means during folding movement of the frame linkage to its lowered open position, detent means engageable to lock and maintain said spring housing member in its rearward spring loaded position during subsequent movement of the top to its latch-maintained closed position, and said detent means being selectively releasable to permit said spring housing to be returned to a forward position by said second and third spring means thereby unloading said third spring means and releasing said latch lever for return to its unlatching position by said first spring means.

8. In a convertible type automotive vehicle having a top movable between opened and closed positions relative to a windshield mounting member supported above the vehicle body and spaced forwardly of a body defined passenger compartment, top latching mechanism comprising striker means mountable adjacent each upper corner of the windshield mounting member, a top supporting frame linkage foldable between a lowered top opened position and a raised position closing the top with respect to the vehicle passenger compartment, said top supporting frame including a front rail member movable into proximate sealing engagement with the windshield mounting member when in its raised position and having two laterally spaced side rail portions extending rearwardly at opposite ends thereof, a pair of latch lever each pivotally mounted adjacent opposite ends of the front rail member for swinging movement between an unlatched position and a top locking position engageable with the adjacent striker means when the top supporting frame is in its raised position, a second pair of levers pivotally mounted adjacent opposite ends of the front rail member and each having a detent arm engageable to restrain the adjacent latch lever in its unlatched position, said second levers each having a second arm thereon engageably cammed by the windshield mounting member during top closing movement of the front rail member relative thereto to disengage said second levers from said latch levers, a spring motor mounted on each side rail portion rearwardly of each latch lever and each of said spring motors including a spring housing member reciprocable longitudinally of its supporting side rail portion, a spring seating member reciprocably mounted relative to each of said spring housing members, each of said spring seating members being operably connected to actuate the adjacent latch lever between its extended and retracted positions, a first pair of spring means interposed between and normally biasing each spring housing member forwardly of its mounting side rail portion toward the adjacent latch lever, a second pair of spring means interposed between each spring housing member and the spring seating member reciprocably mounted relative thereto and deflectable therebetween to resiliently maintain the latch lever in its top locking position, means operably connected to shift each spring housing member rearwardly of the side rail portion against the biasing action of said spring means during folding movement of the top frame to its lowered position, detent means engageable to lock and maintain each spring housing in its rearward spring loaded position during subsequent movement of the top to its latch-maintained closed position, and said detent means being selectively releasable to permit each spring housing to be returned to a forward position thereby unloading said second spring means and returning each latch lever to its unlatching position.

9. A top latching mechanism for an automotive vehicle having a convertible top movable between opened and closed positions relative to a windshield mounting member and a body defined passenger compartment, said top latching mechanism comprising striker means spaced laterally of vehicle on the windshield mounting member, a top supporting frame linkage foldable between top opened and closed positions including a front rail member movable proximate the windshield mounting member when in its closed position, a pair of latch levers pivotally mounted by the front rail member for swinging movement between unlatched and striker engaging top locking positions, a second pair of levers pivotally mounted on the front rail member and each having a detent arm normally engageable to retain the adjacent latch lever in its unlatched position, said second levers each being engageably cammed by the windshield mounting member during top closing movement of the front rail member proximate thereto to disengage the adjacent latch lever for actuation to their striker engaging top locking positions, spring motor means mounted on the top supporting frame and operably connected to actuate each latch lever between its unlatched and top locking positions, said spring motor means including two spring seating members mounted on the frame for relative movement therebetween, one of said spring seating members being operably connected to actuate one of said latch members between its unlatched and top locking positions, a first spring interposed between said spring seating members and normally biasing said one spring seating member in a direction tending to actuate said one latch member toward its top locking position, a second spring interposed between said frame and the other of said spring seating members and normally cooperating with said first spring to bias the other spring seating member oppositely of the first-mentioned direction, means operably connecting the foldable top frame to shift the other spring seating member to deflect and resiliently load both said first and second springs during folding movement of the top frame toward its top opened position, a second detent member engageable to lock and maintain said other spring seating member in its spring loaded position during subsequent movement of the top toward its latch engaging closed position, and said second detent member being selectively releasable to permit return of the other spring seating member to a position unloading said second spring and returning the latch member to its detent lever maintained unlatching position.

References Cited by the Examiner

UNITED STATES PATENTS

| | | | |
|---|---|---|---|
| 2,594,511 | 4/1952 | Steele | 292—336 |
| 3,216,763 | 11/1965 | Heincelman | 296—121 |

FOREIGN PATENTS

| | | |
|---|---|---|
| 311,560 | 5/1929 | Great Britain. |

BENJAMIN HERSH, *Primary Examiner.*

C. C. PARSONS, *Assistant Examiner.*